United States Patent
Nishiyama

[11] Patent Number: 6,105,554
[45] Date of Patent: Aug. 22, 2000

[54] METHOD AND DEVICE FOR FUEL INJECTION FOR ENGINES

[75] Inventor: Yasuhiro Nishiyama, Kanagawa, Japan

[73] Assignee: Isuzu Motors Limited, Tokyo, Japan

[21] Appl. No.: 09/139,660

[22] Filed: Aug. 25, 1998

[30] Foreign Application Priority Data

Aug. 29, 1997 [JP] Japan .................................. 9-247524

[51] Int. Cl.⁷ .................................................. F02M 7/00
[52] U.S. Cl. ........................................... 123/436; 123/357
[58] Field of Search ................... 123/436, 500, 123/501, 357

[56] References Cited

U.S. PATENT DOCUMENTS

| | | | |
|---|---|---|---|
| 4,841,936 | 6/1989 | Takahashi | 123/501 |
| 5,058,553 | 10/1991 | Kondo | 123/501 |
| 5,191,867 | 3/1993 | Glassey | 123/501 |
| 5,243,947 | 9/1993 | Yamamoto | 123/501 |
| 5,678,521 | 10/1997 | Thompson | 123/501 |
| 5,924,403 | 7/1999 | Thomas | 123/436 |

FOREIGN PATENT DOCUMENTS 60-60020   12/1985   Japan .
63-117147   5/1988   Japan .

*Primary Examiner*—Carl S. Miller
*Attorney, Agent, or Firm*—Browdy and Neimark, P.L.L.C.

[57] ABSTRACT

The common-rail type fuel injection method of this invention injects a small amount of fuel during the deceleration of engine to swiftly accomplish reductions in the common rail pressure and the engine revolution speed, thus reducing the amount of NOx at the end of the deceleration. The basic fuel injection amount Qb is determined from the accelerator control input Acc and the engine revolution speed Ne (step S10). When the actual pressure Pf of the common rail is higher than the target pressure $Pf_0$ by more than a predetermined value $\alpha$ (step S11) and also the basic fuel injection amount Qb is smaller than the second fuel injection amount, which is equal to a smaller-than-one factor k times the first fuel injection amount Qpd that stabilizes the engine revolution speed during no-load operation (step S12), then the final fuel injection amount Qfin is set to the second fuel injection amount (step S13) to lower the common rail pressure in order to avoid fuel injection at high pressure when the accelerator is depressed again.

6 Claims, 4 Drawing Sheets

METHOD AND DEVICE FOR FUEL INJECTION FOR ENGINES

BACKGROUND OF THE INVENTION

1. Field of the Invention

The present invention relates to a method and device for controlling a common rail pressure in a common-rail type fuel injection system.

2. Description of the Prior Art

As for the fuel injection control in engines, a common-rail type fuel injection system has been known which provides a high injection pressure and performs optimum control on injection characteristics, such as fuel injection timing and the amount of fuel injected, according to the operating condition of the engine. The common rail type fuel injection system is a fuel injection system that stores in the common rail a fuel pressurized to a predetermined pressure by a pump and then injects the stored fuel from injectors into corresponding combustion chambers. To ensure that the pressurized fuel will be injected from each injector under optimum injection conditions according to the engine operating conditions, a controller controls the fuel pressure in the common rail and the operation of control valves for the injectors according to the operating conditions of the engine.

The conventional common-rail type fuel injection system will be described by referring to FIG. 5. The fuel is supplied to individual injectors 1 from a common rail 2 through branch pipes 3 that form a part of the fuel passage. The fuel, which was pumped by a feed pump 6 from a fuel tank 4 through a filter 5 and pressurized to a predetermined pressure, is delivered to a fuel pump 8 through a fuel pipe 7. The fuel pump 8 may, for example, be a so-called plunger type fuel supply pump driven by the engine which raises the fuel pressure to a high pressure determined by the operating condition of the engine and delivers the pressurized fuel through a fuel pipe 9 to the common rail 2. The fuel is then stored temporarily in the common rail 2 at the elevated pressure, from which it is supplied to individual injectors 1.

Normally there are provided two or more injectors 1 corresponding in number to cylinders in the engine (or according to the type of engine). These injectors 1 are controlled by a controller 12 to inject fuel supplied from the common rail 2 into the corresponding combustion chambers in optimum amounts and at optimum timings. Because the pressure at which the fuel is injected from the injectors 1 is equal to the pressure of the fuel stored in the common rail 2, the injection pressure is controlled by controlling the fuel pressure in the common rail 2.

The fuel released from the fuel pump 8 is returned to the fuel tank 4 through a return pipe 10. Of the fuel supplied from the branch pipes 3 to the injectors 1, the fuel that was not used for injection into the combustion chambers is returned to the fuel tank 4 through a return pipe 11. The controller 12 as an electronic control unit is supplied with signals from various sensors for detecting the engine operating condition, which include: engine cylinder determination and crank angle sensors for detecting an engine revolution speed Ne; an accelerator opening sensor for detecting the amount of accelerator operation Acc; a water temperature sensor for detecting the cooling water temperature; and an intake pipe inner pressure sensor for detecting the inner pressure of the intake pipe.

The controller 12, based on these signals, controls the fuel injection characteristics of the injectors 1, i.e., the fuel injection timing and the amount of fuel to be injected so that the engine output will become optimum for the current engine condition. The common rail 2 is provided with a pressure sensor 13 which detects the fuel pressure in the common rail 2 and sends the detection signal to the controller 12. The controller 12 controls the delivery pressure of the fuel pump 8 so that the fuel pressure in the common rail 2 remains constant even when the fuel in the common rail 2 is consumed for the injection from the injectors 1.

As disclosed in Japanese Patent Publication No. 60020/1985, the common-rail type fuel injection device controls the injection pressure to a target value according to the operating condition and at the same time calculates injection characteristics corresponding to the operating condition, i.e., the amount of fuel to be injected (determined by the fuel injection pressure and the fuel injection timing), and, according to the calculated results, controls the valve openings of the injectors for injecting high-pressure fuel, thereby realizing the fuel injection characteristics conforming to the engine operating state. The fuel pressure is raised by a pump and regulated by a pressure regulating valve to a predetermined injection pressure.

In the common-rail type fuel injection device, the common rail target pressure under normal (steady state) operating condition is so set that the exhaust emission performance is optimum. Under a transient state where the common rail target pressure is not constant, however, the exhaust emission performance may deteriorate unless an appropriate pressure control is provided. That is, in the common-rail type fuel injection device, although raising the fuel injection pressure can easily be done by raising the common rail pressure by operating the control valve of the fuel pump, the common rail pressure cannot be lowered except by fuel injection from the injectors or by leaking fuel from the injection system such as common rail.

Hence, in a situation where the accelerator pedal is quickly released as when a vehicle sharply decelerates from high speed, or where during a high-speed traveling the accelerator pedal is released to such an extent that the fuel is not injected from the injectors, the engine output revolution decreases and the common rail target pressure determined by the controller according to the result of detection of the amount of the accelerator pedal depression quickly becomes small. However, the actual common rail pressure cannot follow the rapid reduction in the target pressure and remains high. That is, because the fuel injection from the injectors are stopped, the fuel in the common rail is not consumed. Further, the fuel cannot be expected to leak within a short period of time from an injection system ranging from the common rail to the injectors. Hence, the actual common rail pressure continues to be high. In such a condition, when the fuel injection from the injectors is resumed, the fuel is injected at high pressure, increasing NOx and degrading the exhaust emission performance.

To deal with the lack of quick response on the part of the common rail pressure to the reduction in the common rail target pressure described above, Japanese Patent Laid-Open No. 117147/1988 discloses a fuel injection device incorporating a rapid pressure reducing system in the common rail. The rapid pressure reducing system is a fuel injection control device for internal combustion engines that delivers fuel by a variable displacement pump from the fuel tank to a fuel accumulator, supplies fuel from the fuel accumulator to the fuel injection valves, and controls the amount of fuel delivered by the variable displacement fuel pump so that the fuel pressure in the fuel accumulator detected by a pressure sensor matches the target fuel pressure determined according to the engine operating condition. When the fuel pressure of the fuel accumulator detected by the pressure sensor is higher than the target fuel pressure by a predetermined value or larger, a pressure reduction relief valve (solenoid valve) provided in the fuel accumulator is opened to release the high pressure fuel from the fuel accumulator through a relief pipe. With this fuel injection control device for internal combustion engines, when the vehicle is rapidly decelerated, the fuel pressure swiftly changes from the high-pressure state to the low-pressure state, preventing a delay in reducing the pressure of the fuel accumulator which would otherwise be caused by small fuel consumption at deceleration. The rapid pressure reduction system in the common rail, however, requires a relief valve and a relief pipe for pressure reduction, increasing the number of parts and therefore the cost of the fuel injection control device.

SUMMARY OF THE INVENTION

The object of this invention is to solve the above problem by using the existing system without having to use additional parts such as relief valve and relief pipe and to provide a fuel injection method and device for engines which, when the fuel injection amount quickly decreases as when rapidly reducing the accelerator pedal depression amount to zero, enables a quick reduction in the common rail pressure by slightly increasing the fuel injection amount to such an extent as will not affect the engine output and the exhaust emission performance.

The invention relates to a fuel injection method for engines which comprises the steps of: storing fuel delivered by a fuel pump in a common rail; determining a basic fuel injection amount and a target pressure of the common rail based on the engine operating condition; injecting the basic fuel injection amount of fuel supplied from the common rail into combustion chambers through injection holes formed in injectors; and controlling the fuel pump to match the pressure of the common rail with the target pressure of the common rail; wherein when a pressure condition is met in which the common rail pressure is higher than the target pressure by more than a predetermined value, the amount of fuel to be injected from the injectors is set to a second fuel injection amount which is smaller than a first fuel injection amount that stabilizes the engine revolution speed when the engine is running with no load.

This invention also relates to a fuel injection device for engines which comprises: a common rail to store fuel delivered by a fuel pump; injectors formed with injection holes through which to inject the fuel supplied from the common rail into combustion chambers; an operation state detection means to detect an operating condition of the engine; a pressure sensor to detect a pressure of the common rail; and a controller to determine a basic fuel injection amount and a target pressure of the common rail based on the engine operating condition detected by the operation state detection means and to control the fuel pump to match the common rail pressure detected by the pressure sensor with the common rail target pressure; wherein when a pressure condition is met in which the common rail pressure is higher than the common rail target pressure by more than a predetermined value, the controller sets the amount of fuel to be injected from the injectors to a second fuel injection amount which is smaller than a first fuel injection amount that stabilizes the engine revolution speed when the engine is running with no load.

With this fuel injection method, when the pressure condition is met whereby the actual pressure of the common rail is higher than the target pressure by more than a predetermined value, the amount of fuel to be injected from the injectors is set to the second fuel injection amount which is less than the first fuel injection amount that stabilizes the engine revolution speed during the no-load operation. This ensures reduction in the engine revolution speed. The second fuel injection amount is equal to the first fuel injection amount (which may be constant or varies with the revolution speed) multiplied by a factor of less than one. Because the fuel corresponding to the second fuel injection amount continues to be supplied from the common rail to the injectors where it is consumed for injection, the common rail pressure can be reduced reliably. Hence, when the accelerator is operated next to perform positive fuel injections, the fuel can be prevented from being injected at abnormally high common rail pressure or fuel injection pressure, thus avoiding degradation of the exhaust emission characteristics.

When the pressure condition is met and also the injection amount condition is met whereby the basic fuel injection amount is less than the second fuel injection amount, the amount of fuel to be injected from the injectors is set to the second fuel injection amount. When, with the pressure condition met, the basic fuel injection amount is very small, less than the second fuel injection amount, the amount of fuel to be injected increases slightly to the second fuel injection amount. An increase in the amount of fuel supplied from the common rail therefore swiftly reduces the common rail pressure.

Further, when the pressure condition is met, the fuel injection timing at which to inject fuel from the injectors is delayed from an injection timing used when the pressure condition is not met. Because the common rail pressure when the pressure condition is met is higher than the target pressure by more than a predetermined value, the fuel is injected through injection holes of the injectors at higher injection pressures than when the pressure condition is not met. Therefore, a large amount of fuel can be injected even during a shorter injection period. Because injection of a large amount of fuel at an early stage in the fuel injection period can cause undesired phenomena in terms of engine characteristics such as knocking, the fuel injection timing is delayed.

DETAILED DESCRIPTION OF THE EMBODIMENT

One embodiment of the fuel injection method and device for engines according to this invention will be described by referring to the accompanying drawings.

Figure 1:
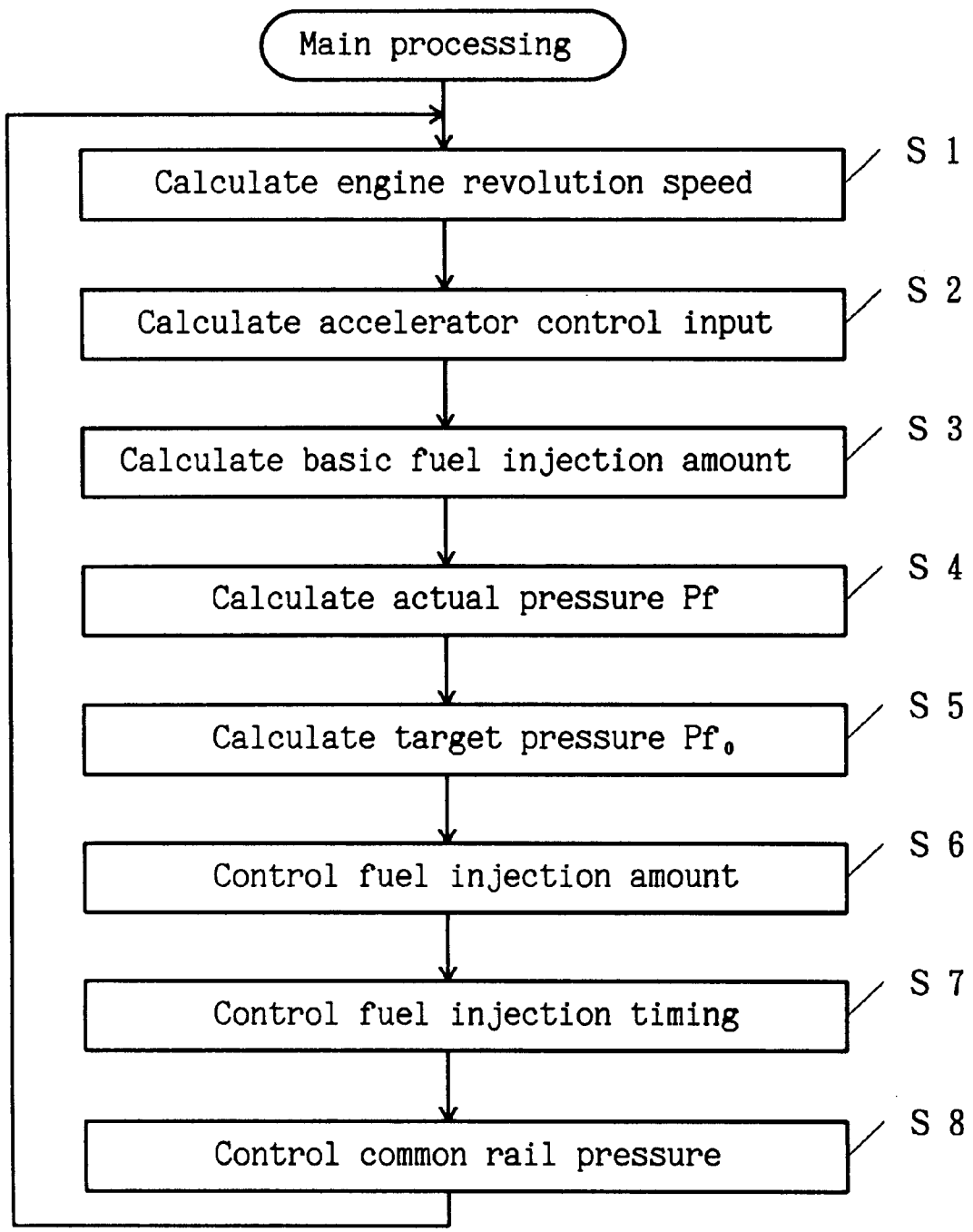
FIG. 1 is a flowchart of a main routine showing one example of a fuel injection control steps in the fuel injection method and device for engines of this invention.
Figure 5:
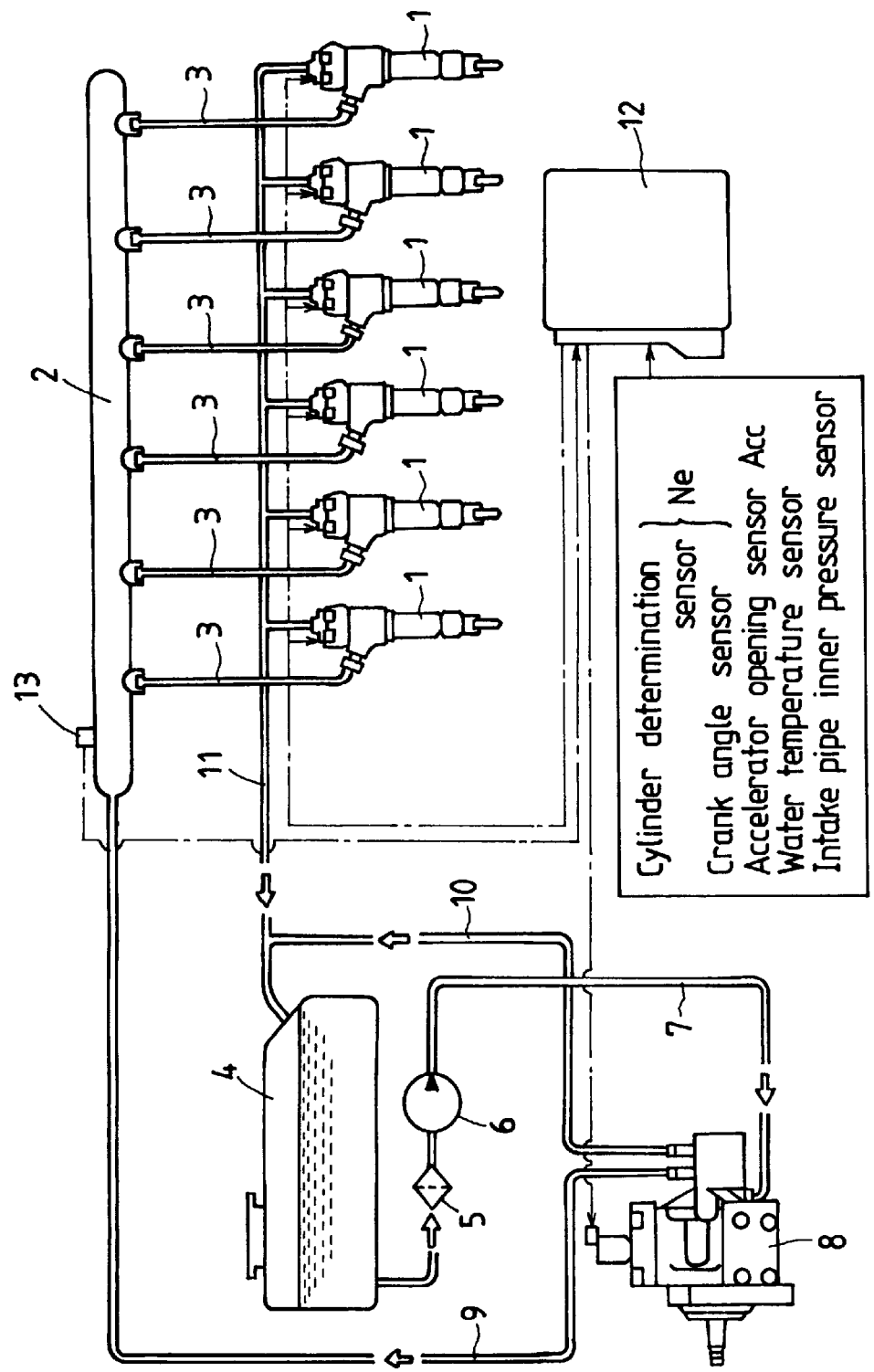
FIG. 5 is a schematic diagram showing the common-rail type fuel injection system.

Let us first explain about the main routine shown in FIG. 1. This routine is in practice executed during an interrupt processing. This embodiment applies to the common-rail type injection system shown in FIG. 5.

(1) An engine revolution speed Ne is calculated by using pulses generated by the rotation of the output shaft of the engine (the pulses may be detected by a pickup sensor accessing the teeth of a gear secured to the output shaft) (step S1).

(2) An accelerator control input Acc is calculated from signals detected by an accelerator opening sensor (for example, an accelerator pedal depression amount sensor) (step S2).

(3) A basic fuel injection amount Qb is calculated based on the engine revolution speed Ne calculated by step S1 and the accelerator control input Acc calculated by step S2 (step S3). The engine revolution speed Ne and the accelerator control input Acc represent the operating condition of the engine.

(4) A pressure of the common rail 2 (i.e., actual pressure) Pf is calculated from signals detected by the pressure sensor 13 installed in the common rail (step S4).

(5) A target pressure $Pf_0$ of the common rail 2 is calculated based on the engine revolution speed Ne calculated by step S1 and the basic fuel injection amount Qb calculated by step S3 (step S5).

(6) A final fuel injection amount Qfin to be injected from the injector 1 conforming to the operating condition at that instant is determined based on the information calculated by steps S1–S5 (step S6). Details will be explained by referring to the flowchart of FIG. 2.

(7) A fuel injection timing T at which to inject fuel from the injector conforming to the operating condition at that instant is determined based on the information calculated by steps S1–S5 (step S7). Details will be explained by referring to the flowchart of FIG. 3.

(8) A feedback control on the common rail pressure is performed based on a deviation between the target pressure $Pf_0$ of the common rail 2 and the actual pressure Pf of the common rail 2 (step S8). The feedback control generally used is a PID control.

Figure 2:
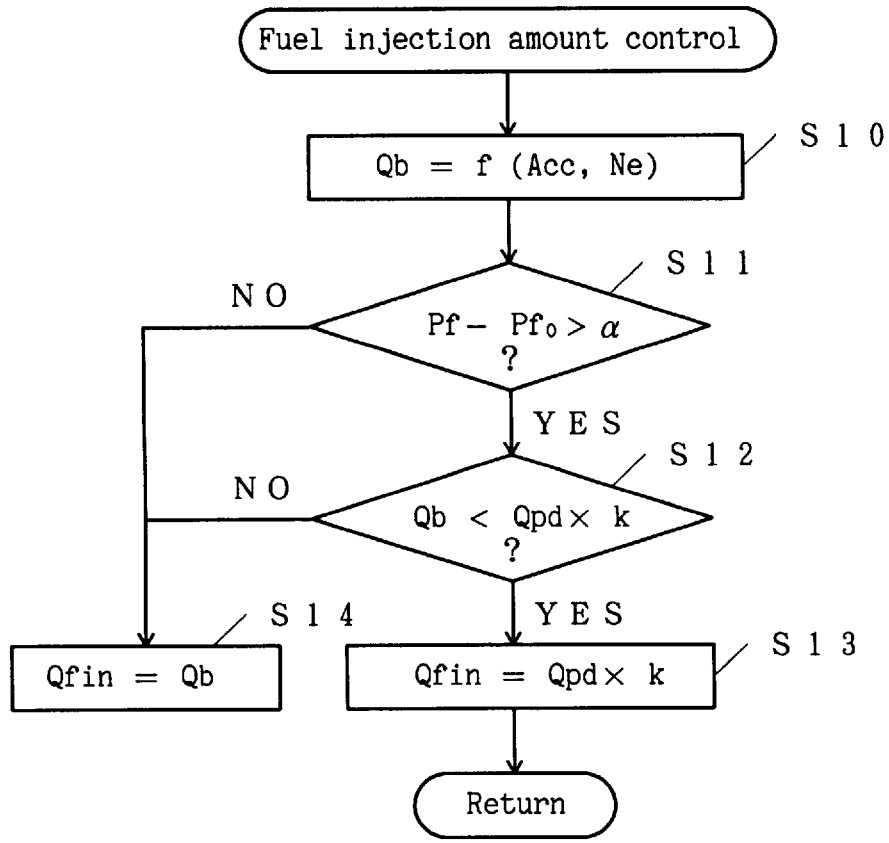
FIG. 2 is a flowchart of a subroutine showing fuel injection amount control steps in the flowchart of FIG. 1.

Referring to the flowchart of FIG. 2, the fuel injection amount control will be detailed.

(1) The basic fuel injection amount Qb is calculated from the engine revolution speed Ne and the accelerator control input Acc (step S10=S3).

(2) A comparison is made to see if the difference $(Pf-Pf_0)$ between the actual pressure Pf of the common rail 2 calculated by step S4 and the target pressure $Pf_0$ of the common rail 2 calculated by step S5 is larger than a predetermined value $\alpha$ (positive value) (step S11).

(3) If the comparison at step S11 decides that the difference $(Pf-Pf_0)$ is larger than the predetermined value $\alpha$, then it is checked whether the basic fuel injection amount Qb calculated by step S10 is smaller than a value (second fuel injection amount) equal to a first fuel injection amount Qpd multiplied by a certain factor k (0<k<1) (step S12). Here the first fuel injection amount Qpd is the amount of fuel to be injected when the revolution speed of the engine in no-load state is stable. The first fuel injection amount Qpd may be set to a constant value regardless of the engine revolution speed Ne, but is preferably made a function of the engine revolution speed Ne (which increases with the engine revolution speed Ne) since it is more realistic to the actual engine. This function is mapped by operating the engine beforehand and then input to the controller.

(4) When at step S12 it is decided that the basic fuel injection amount Qb calculated by step S10 is smaller than the second fuel injection amount (Qb<Qpdxk), this means that, from the judgment of step S11, the actual pressure Pf of the common rail 2 is higher than the rapidly decreasing target pressure $Pf_0$ of the common rail 2 and that, from the judgment of step S12, because the fuel injection amount is very small the pressure can fall only slowly through the fuel supply from the common rail, slowing down the actual pressure's action of following the target pressure $Pf_0$ of the common rail 2. In this case, the final fuel injection amount Qfin is corrected and set to the second fuel injection amount Qpdxk (k<1) (step S13). The fuel injection amount increases from the basic fuel injection amount Qb, which is smaller than Qpdxk, to the second fuel injection amount Qpdxk that is larger than the basic fuel injection amount Qb but smaller than the first fuel injection amount Qpd. As a result, the amount of fuel supplied from the common rail 2 increases, promoting the common rail pressure reduction. As to the engine revolution speed Ne, because the second fuel injection amount is less than the first fuel injection amount Qpd that is used when the revolution speed of the engine with no load is stable, the engine revolution speed Ne decreases progressively as determined from the engine operating condition.

(5) When step S11 decides that the difference $(Pf-Pf_0)$ is smaller than the predetermined value $\alpha$, and when step S12 decides that the basic fuel injection amount Qb is larger than the first fuel injection amount Qpd multiplied by a certain factor k (k<1), then the final fuel injection amount Qfin is set to the basic fuel injection amount Qb that was calculated by step S10. That is, when the target pressure $Pf_0$ of the common rail 2 is not rapidly decreasing when compared with the actual pressure Pf of the common rail 2, or when the fuel injection amount, i.e., the amount of fuel supplied from the common rail 2 is more than a certain value and a common rail pressure fall can be expected, the fuel injection amount is not corrected and the final fuel injection amount Qfin is set to the basic fuel injection amount Qb (step S14).

Figure 3:
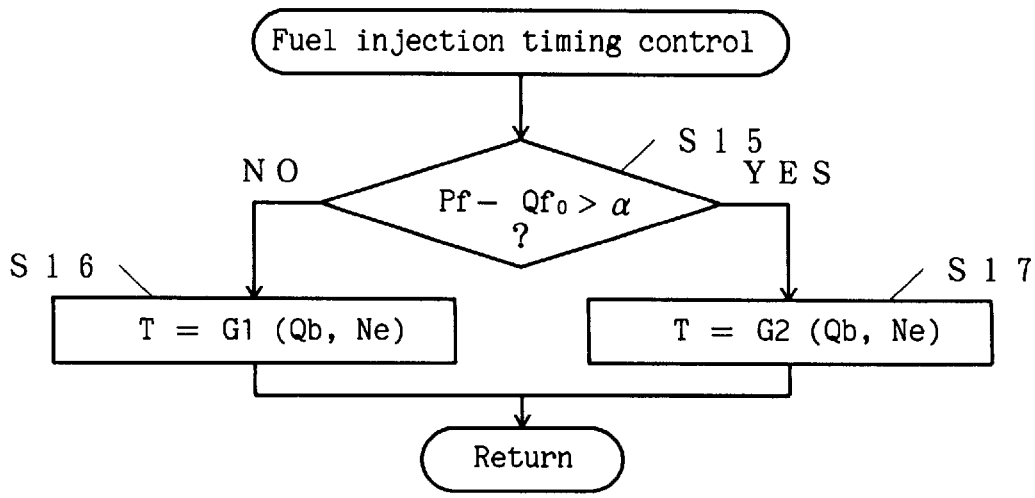
FIG. 3 is a flowchart of a subroutine showing an injection timing control steps in the flowchart of FIG. 1.

Next, referring to FIG. 3, the fuel injection timing in the combustion cycle, i.e., the fuel injection timing control will be explained.

(1) It is checked, as in the fuel injection amount processing, whether the difference $(Pf-Pf_0)$ between the actual pressure Pf of the common rail 2 calculated by step S4 and the target pressure $Pf_0$ of the common rail 2 calculated by step S5 is larger than the predetermined value a (positive value) (step S15=S11).

(2) When the difference $(Pf-Pf_0)$ is smaller than $\alpha$, i.e., when it is decided that the actual pressure Pf of the common rail 2 is relatively close to the target pressure $Pf_0$ of the common rail 2, the injection timing T determined by the basic fuel injection amount Qb and the engine revolution speed Ne is obtained from a function G1 (Qb, Ne) (step S16). The function G1 is mapped beforehand to such values that the exhaust emission performance and the engine output will become appropriate.

(3) When the difference $(Pf-Pf_0)$ is larger than $\alpha$, i.e., when it is decided that the actual pressure Pf of the common rail 2 is significantly higher than the target pressure $Pf_0$, the injection timing T determined by the basic fuel injection amount Qb and the engine revolution speed Ne is obtained from a function G2 (Qb, Ne) (step S17). The function G2 offers a timing that takes a degraded NOx emission performance into account and which is retarded from the injection timing determined from the function G1. That is, the function G2 delays the injection. Because the common rail pressure is high, even a short fuel injection period can inject a large amount of fuel. In this case, the fuel is injected at a retarded timing in the fuel injection cycle that provides a more stable engine combustion characteristic.

Figure 4:
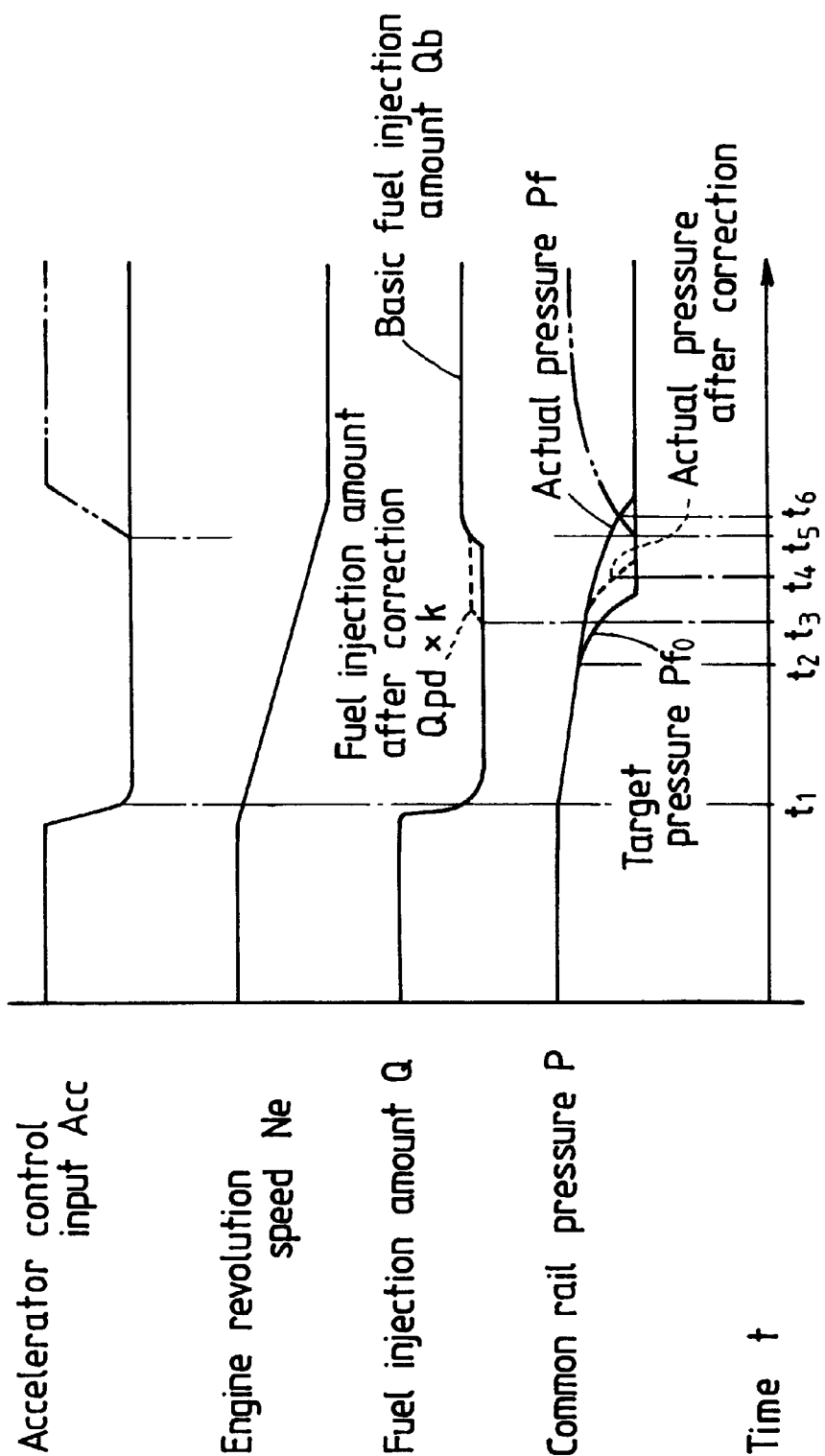
FIG. 4 is a graph showing how the engine revolution speed, the fuel injection amount and the common rail pressure change when the accelerator opening, i.e., the accelerator pedal depression amount, is reduced from a certain depression amount to zero.

Referring to FIG. 4, the fuel injection control in the engine fuel injection method and device of this invention will be explained. FIG. 4 shows how the engine revolution speed Ne, the fuel injection amount Q and the common rail pressure P change when the accelerator opening Acc, i.e., accelerator pedal depression amount, is changed from a certain depression amount to zero at time $t_1$. When the accelerator pedal depression is reduced from a certain depression amount to zero, the basic fuel injection amount Qb represented by a solid line sharply decreases (for example, to zero) with the engine revolution speed Ne starting to slow down progressively. Because the basic fuel injection amount Qb, i.e., the fuel supply from the common rail 2, sharply decreases, the actual pressure Pf of the common rail 2 can fall only slowly at a rate corresponding, for example, to the fuel leakage from the injectors 1.

At time $t_2$ when the engine revolution speed decreases to a certain value, the target pressure $Pf_0$ of the common rail 2 as obtained from the predetermined map decreases with respect to the actual pressure Pf so that the exhaust emission performance at the next fuel injection timing will be appropriate. The target pressure $Pf_0$ calculated from the accelerator pedal depression amount Acc and the engine revolution speed Ne falls relatively fast but the actual pressure Pf cannot follow it. At time $t_3$ the difference $(Pf-Pf_0)$ becomes larger than the predetermined value α and the basic fuel injection amount Qb is smaller than the second fuel injection amount equal to the first fuel injection amount Qpd multiplied by a certain factor k (0<k<1). Hence, it is decided that the fall of the actual pressure Pf cannot be expected, and the final fuel injection amount Qfin is increased to the second fuel injection amount Qpdxk as shown with a dashed line. As a result, the actual pressure Pf falls to approach closer to the target pressure $Pf_0$ and earlier than it would otherwise. This prevents the fuel injection amount from becoming excessively large when it is increased next and the exhaust emission performance from deteriorating.

At time $t_4$, the difference $(Pf-Pf_0)$ is smaller again than the predetermined value α. In this case, according to the judgment of S11, the final fuel injection amount Qfin may be set to the basic fuel injection amount Qb. When the basic fuel injection amount Qb can be expected to rise some time later, the second fuel injection amount Qpdxk is maintained. That is, as shown in FIG. 4, the fuel injection amount control may be given a hysteresis in which when the correction increases the fuel injection amount, the control immediately increases it and in which when stopping the correction reduces the fuel injection amount, the control does not immediately reduces it but maintains the increased fuel injection amount for some time. This limits frequent variations in the fuel injection amount allowing a smooth control on the fuel injection amount. When at time $t_5$ the accelerator is depressed again, the target pressure $Pf_0$ rises after $t_5$ as shown by a two-dotted line. If the correction of the common rail pressure P is not made, the actual pressure Pf is still higher than the target pressure $Pf_0$ until time $t_6$, causing deterioration of the exhaust emissions. But if the correction is made, it is seen that the actual pressure Pf is already reduced, improving the exhaust emissions.

What is claimed is:

1. A fuel injection method for engines comprising the steps of:

storing fuel delivered by a fuel pump in a common rail;

determining a basic fuel injection amount and a target pressure of the common rail based on the engine operating condition;

injecting the fuel supplied from the common rail into combustion chambers through injection holes formed in injectors; and controlling the fuel pump to match the pressure of the common rail with the target pressure of the common rail;

wherein a first fuel injection amount is set as an amount that stabilizes the engine revolution speed when the engine is running with no load, and wherein when a pressure condition is met in which the common rail pressure is higher than the target pressure by more than a predetermined value, and also an injection amount condition is met in which the basic fuel injection amount is smaller than the second fuel injection amount which is smaller than the first fuel injection amount, the amount of fuel to be injected from the injectors is set to the second fuel injection amount.

2. A fuel injection method for engines according to claim 1, wherein when the pressure condition is met and also an injection amount condition is met in which the basic fuel injection amount is almost zero, the amount of fuel to be injected from the injectors is set to the second fuel injection amount.

3. A fuel injection method for engines according to claim 1, wherein when the pressure condition is met and also the injection amount condition is met, a fuel injection timing at which to inject fuel from the injectors is delayed from a timing used when the pressure condition is not met.

4. A fuel injection device for engines comprising:

a common rail to store fuel delivered by a fuel pump;

injectors formed with injection holes through which to inject the fuel supplied from the common rail into combustion chambers;

an operation state detection means to detect an operating condition of the engine;

a pressure sensor to detect a pressure of the common rail; and a controller to determine a basic fuel injection amount and a target pressure of the common rail based on the engine operating condition detected by the operation state detection means and to control the fuel pump to match the common rail pressure detected by the pressure sensor with the common rail target pressure;

wherein the controller sets a first fuel injection amount as an amount that stabilizes the engine revolution speed when the engine is running with no load, and wherein when a pressure condition is met in which the common rail pressure is higher than the common rail target pressure is higher than the common rail target pressure by more than a predetermined value, and also an injection amount is smaller than the second fuel injection amount which is smaller than the first fuel injection amount, the controller sets the amount of fuel to be injected from the injectors to the second fuel injection amount.

5. A fuel injection device for engines according to claim 4, wherein when the pressure condition is met and also an injection amount condition is met in which the basic fuel injection amount is almost zero, the controller sets the amount of fuel to be injected from the injectors to the second fuel injection amount.

6. A fuel injection device for engines according to claim 4, wherein when the pressure condition is met, the controller delays a fuel injection timing at which to inject fuel from the injectors from a timing used when the pressure condition is not met.

* * * * *